US011359078B2

(12) United States Patent
Na et al.

(10) Patent No.: US 11,359,078 B2
(45) Date of Patent: Jun. 14, 2022

(54) RUBBER COMPOSITION (71) Applicant: LG CHEM, LTD., Seoul (KR)

(72) Inventors: Youk Reol Na, Daejeon (KR); Jae Sun Choi, Daejeon (KR); Jin Young Kim, Daejeon (KR); No Ma Kim, Daejeon (KR)

(73) Assignee: LG Chem, Ltd.

( * ) Notice: Subject to any disclaimer, the term of this patent is extended or adjusted under 35 U.S.C. 154(b) by 316 days.

(21) Appl. No.: 16/622,208

(22) PCT Filed: Jan. 30, 2019

(86) PCT No.: PCT/KR2019/001307
§ 371 (c)(1),
(2) Date: Dec. 12, 2019

(87) PCT Pub. No.: WO2019/156418
PCT Pub. Date: Aug. 15, 2019

(65) Prior Publication Data
US 2021/0147656 A1 May 20, 2021

(30) Foreign Application Priority Data
Feb. 7, 2018 (KR) .................. 10-2018-0015163

(51) Int. Cl.
C08F 2/04 (2006.01)
C08L 9/06 (2006.01)
C08K 3/36 (2006.01)
C08K 3/06 (2006.01)
B60C 1/00 (2006.01)
C08F 136/06 (2006.01)

(52) U.S. Cl.
CPC .................... C08L 9/06 (2013.01); B60C 1/00 (2013.01); C08F 2/04 (2013.01); C08F 136/06 (2013.01); C08K 3/06 (2013.01); C08K 3/36 (2013.01); C08F 2810/40 (2013.01); C08L 2205/02 (2013.01)

(58) Field of Classification Search
CPC ..... C08L 9/06; C08K 3/36; C08K 3/06; C08F 2/04; B60C 1/00
USPC ........................................ 523/156
See application file for complete search history.

(56) References Cited

U.S. PATENT DOCUMENTS

| 4,397,994 A | 8/1983 | Takeuchi et al. |
| 8,648,141 B2 | 2/2014 | Hamann et al. |
| 10,533,083 B2 | 1/2020 | Yamashiro |
| 10,563,051 B2 | 2/2020 | Miyazaki |
| 2008/0233399 A1 | 9/2008 | Asakura et al. |
| 2010/0152389 A1 | 6/2010 | Asakura et al. |
| 2011/0319519 A1 | 12/2011 | Sone et al. |
| 2012/0010356 A1 | 1/2012 | Hamann et al. |
| 2013/0165578 A1 | 6/2013 | Francik et al. |
| 2014/0256847 A1 | 9/2014 | Sato et al. |
| 2016/0009846 A1 | 1/2016 | Sato et al. |
| 2017/0174001 A1 | 6/2017 | Miyazaki et al. |
| 2017/0253728 A1 | 9/2017 | Miyazaki |
| 2017/0369685 A1 | 12/2017 | Yamashiro |
| 2018/0099527 A1 | 4/2018 | Miyazaki |
| 2018/0105683 A1 | 4/2018 | Miyazaki |
| 2018/0134079 A1 | 5/2018 | Miyazaki |
| 2018/0237619 A1 | 8/2018 | Tanaka |

FOREIGN PATENT DOCUMENTS

| CN | 106459514 A | | 2/2017 |
| CN | 106574078 A | | 4/2017 |
| CN | 107614590 A | | 1/2018 |
| EP | 1426408 A | * | 6/2004 |
| EP | 2 408 626 B1 | | 5/2013 |
| EP | 2 607 103 A2 | | 6/2013 |
| EP | 3 263 360 A1 | | 1/2018 |
| EP | 3 281 979 A1 | | 2/2018 |
| EP | 3 327 042 A1 | | 5/2018 |
| JP | H07-292161 A | | 11/1995 |
| JP | 2014145061 A | | 8/2014 |
| JP | 2016-500739 A | * | 1/2016 |
| JP | 2016204503 A | | 12/2016 |
| JP | 2016204504 A | | 12/2016 |
| JP | 2017002189 A | | 1/2017 |
| JP | 2018002780 A | | 1/2018 |
| KR | 100780478 B1 | | 11/2007 |
| KR | 10-0841792 B1 | | 6/2008 |
| KR | 10-20110072403 A | | 6/2011 |
| KR | 10-20110072406 A | | 6/2011 |
| KR | 10-20110131217 A | | 12/2011 |
| KR | 10-20150110668 A | | 10/2015 |
| WO | 2013077020 A1 | | 5/2013 |

OTHER PUBLICATIONS

Search Report from Chinese Application No. 201980002943.9 dated Jun. 23, 2021. 3 pgs.
Chemical Retrieval on the Web (CROW): "Prediction of Solubility Parameters", XP055687364, Polymerdatabase.com, 2015, 18 pages.
Schuster, et al.: "Selective Interactions in Elastomers, a Base for Compatibility and Polymer-Filler Interactions", XP009501062, Rubber Chem. Technol., vol. 69, No. 5, Nov. 5, 1996, pp. 769-780.

* cited by examiner

Primary Examiner — Deve V Hall
(74) Attorney, Agent, or Firm — Lerner, David, Littenberg, Krumholz & Mentlik, LLP (57) ABSTRACT The present invention relates to a rubber composition having excellent abrasion resistance and improved tensile and viscoelastic properties by controlling compatibility among rubber components, and a tire manufactured using the same.

10 Claims, 4 Drawing Sheets

RUBBER COMPOSITION

CROSS-REFERENCE TO RELATED APPLICATIONS

The present application is the U.S. national phase of international application No. PCT/KR2019/001307, filed on Jan. 30, 2019, and claims the benefit of priority based on Korean Patent Application No. 10-2017-0015163, filed on Feb. 7, 2018, the entire contents of which are incorporated herein by reference.

FIELD

The present invention relates to a rubber composition having excellent abrasion resistance and improved tensile properties and viscoelasticity properties by controlling compatibility among rubber components, and a tire manufactured using the same.

BACKGROUND

Recently, according to the demand for cars having a low fuel consumption ratio, the decrease of rolling resistance of tires is required, and tires having modulational stability represented by wet skid resistance as well as excellent abrasion resistance and tensile properties in respect of safety are required.

For example, in order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a binder such as a tin compound.

In addition, carbon black, silica, etc. are used as a reinforcing filler of a tire tread, and if the silica is used as the reinforcing filler, advantages of improving low hysteresis loss and wet skid resistance are achieved. However, silica at a hydrophilic surface has low affinity with a rubber component when compared with carbon black at a hydrophobic surface and agglomeration among silica is increased, and thus, a separate silane coupling agent is required to improve dispersibility or impart coupling between silica-rubber. Accordingly, a method of introducing a functional group having affinity or reactivity with silica at the terminal of a rubber molecule is conducted, but the effects thereof are insufficient.

SUMMARY

The present invention has been devised to solve the above-mentioned problems of the conventional technique, and an object of the present invention is to provide a rubber composition having excellent abrasion resistance and improved tensile properties and viscoelasticity properties by controlling compatibility among rubber components.

In addition, another object of the present invention is to provide a tire manufactured using the rubber composition.

To solve the above-mentioned tasks, the present invention provides a rubber composition including, based on 100 parts by weight of rubber components including a first synthetic rubber and a second synthetic rubber, 30 parts by weight to 90 parts by weight of the first synthetic rubber; parts by weight to 70 parts by weight of the second synthetic rubber; and 30 to 200 parts by weight of a filler, wherein a solubility parameter difference between the first synthetic rubber and the second synthetic rubber is greater than 0.82, and the first synthetic rubber is a both-terminals modified rubber having a styrene content of 38 wt % or more and bonding a functional groups at both terminals.

In addition, there is provided a tire manufactured using the rubber composition.

The rubber composition according to the present invention includes heterogeneous rubber components of a first synthetic rubber and a second synthetic rubber, wherein the first synthetic rubber and the second synthetic rubber are selected and included so that a solubility parameter difference therebetween is greater than a specific range so as to control compatibility among rubbers, thereby achieving excellent abrasion resistance and improved tensile properties and viscoelasticity properties.

BRIEF DESCRIPTION OF THE DRAWINGS

The following drawings attached to the specification illustrate preferred examples of the present invention, and serve to enable technical concepts of the present invention to be further understood together with detailed description of the invention given below, and therefore the present invention should not be interpreted only with matters in such drawings.

FIGS. 2A to 2E show TEM images (magnification 28K) on rubber compositions according to embodiments of the present invention.

FIGS. 4A to 4D show TEM images (magnification 28K) on rubber compositions according to embodiments of the present invention.

DETAILED DESCRIPTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "solubility parameter (δ)" used in the present invention represents a characteristic value of a material, which is the measure of mixing of materials, and was calculated by Mathematical Formula 1 below, which is a known solubility parameter calculation formula (RUBBER CHEMISTRY AND TECHNOLOGY: November 1996, Vol. 69, No. 5, pp 769-780).

$$\delta = 17.17 + 0.0272 \text{ (styrene wt \%)} - 0.0069 \text{ (vinyl wt \%)}$$ [Mathematical Formula 1]

The present invention provides a rubber composition having excellent abrasion resistance and improved tensile properties and viscoelasticity properties.

The rubber composition according to an embodiment of the present invention is characterized in including, based on 100 parts by weight of rubber components including a first synthetic rubber and a second synthetic rubber, 30 parts by weight to 90 parts by weight of the first synthetic rubber; parts by weight to 70 parts by weight of the second synthetic rubber; and 30 to 200 parts by weight of a filler, wherein a solubility parameter difference between the first synthetic rubber and the second synthetic rubber is greater than 0.82, and the first synthetic rubber is a both-terminals modified rubber having a styrene content of 38 wt % or more and bonding functional groups at both terminals.

Particularly, the first synthetic rubber and the second synthetic rubber may have a solubility parameter difference of greater than 0.82 and less than or equal to 1.05. If the solubility parameter difference has the above-mentioned range, the phase separation between the first synthetic rubber and the second synthetic rubber is easy, and wet skid resistance (braking performance) may be excellent and abrasion resistance may be excellent.

Particularly, if the solubility parameter difference is less than or equal to 0.82, the phase separation between the first synthetic rubber and the second synthetic rubber may be restrained and wet skid resistance (braking performance) may be reduced. Meanwhile, if the solubility parameter difference is greater than 0.82, desired effects may be achieved, but for preferred effects, the difference may be greater than 0.82 and less than or equal to 1.05. If the solubility parameter difference is greater than 1.05, the phase separation between the first synthetic rubber and the second synthetic rubber may occur excessively, and the decrease of abrasion resistance (or tear performance) may rather occur.

The rubber composition according to an embodiment of the present invention incudes heterogeneous rubber components of the first synthetic rubber and the second synthetic rubber, but the first synthetic rubber and the second synthetic rubber are selected so that solubility parameters between them are different by a specific range. Thus, compatibility among rubber components may be controlled, and physical properties of each of the first synthetic rubber and the second synthetic rubber may be shown at the same time. As a result, abrasion resistance may be excellent and tensile properties and viscoelasticity properties may be improved.

Hereinafter, each component included in the rubber composition according to an embodiment of the present invention will be explained in particular.

First Synthetic Rubber

In an embodiment of the present invention, the first synthetic rubber may be a solution-polymerized conjugated diene-based rubber, and particularly, the first synthetic rubber may be a both terminal-modified rubber in which functional groups are bonded at both terminals.

Particularly, the first synthetic rubber is a solution-polymerized conjugated diene-based rubber, and in this case, the solution-polymerized conjugated diene-based rubber may be a copolymer which includes a repeating unit derived from an aromatic vinyl-based monomer and a repeating unit derived from a conjugated diene-based monomer, and of which both terminals are bonded to functional groups, wherein the styrene content may be 38 wt % or more, more particularly, the styrene content may be from 38 wt % to 55 wt %, further more particularly, the styrene content may be from 38 wt % to 45 wt %. If the solution-polymerized conjugated diene-based rubber has the above-mentioned styrene content, effects of excellent rolling resistance, wet skid resistance and a low fuel consumption ratio may be achieved.

In addition, the solution-polymerized conjugated diene-based rubber may include an extender oil, and in this case, the solution-polymerized conjugated diene-based rubber may include the extender oil in an amount of greater than 0 wt % and less than or equal to 37.5 wt %.

In addition, the solution-polymerized conjugated diene-based rubber may have the vinyl content of 10 wt % or more, 10 wt % to 40 wt %, or 20 wt % to 40 wt %, and within this range, the glass transition temperature may be controlled in an appropriate range and rolling resistance, wet skid resistance and a low fuel consumption ratio may be excellent. Here, the vinyl content may mean the amount of not 1,4-added but 1,2-added conjugated diene-based monomer with respect to 100 wt % of a conjugated diene-based copolymer composed of a monomer having a vinyl group and an aromatic vinyl-based monomer.

In addition, the functional group may be an amine group and an aminoalkoxysilane group. For example, in the solution-polymerized conjugated diene-based rubber, the amine groups or the aminoalkoxysilane groups may be bonded to both terminals, or the amine group may be bonded to one terminal and the aminoalkoxysilane group may be bonded to the other terminal.

In addition, the solution-polymerized conjugated diene-based rubber may have a number average molecular weight (Mn) of 20,000 g/mol to 800,000 g/mol, 100,000 g/mol to 550,000 g/mol, or 150,000 g/mol to 500,000 g/mol, a weight average molecular weight (Mw) of 40,000 g/mol to 2,000,000 g/mol, 150,000 g/mol to 900,000 g/mol, or 200,000 g/mol to 800,000 g/mol. Within these ranges, rolling resistance and wet skid resistance are excellent. In another embodiment, the solution-polymerized conjugated diene-based rubber may have molecular weight distribution (Mw/Mn) of 1.0 to 4.0, 1.1 to 3.5, or 1.3 to 3.0, and within this range, balance among physical properties is excellent.

Here, the weight average molecular weight (Mw) and the number average molecular weight (Mn) are polystyrene converted molecular weights analyzed by gel permeation chromatography (GPC), respectively, and the molecular weight distribution (Mw/Mn) is also referred to as polydispersity and was calculated as a ratio (Mw/Mn) of the weight average molecular weight (Mw) and the number average molecular weight (Mn).

In another embodiment, the solution-polymerized conjugated diene-based rubber may have mooney viscosity of 40 to 120, or 50 to 100 at 100° C., and within this range, processability and productivity are excellent. In this case, the solution-polymerized conjugated diene-based rubber may not include an extender oil.

Here, the mooney viscosity was measured by using a mooney viscometer, for example, using a Large Rotor of MV2000E (ALPHA Technologies Co.) at a rotor speed of 2±0.02 rpm at 100° C. and 140° C. Particularly, a polymer was stood at room temperature (23±3° C.) for 30 minutes or more, and 27±3 g of the polymer was collected and put in a die cavity, and then, Platen was operated while applying torque and measurement was performed.

The term "derived repeating unit" used in the present invention may represent a component or a structure comes from a certain material, or the material itself. For example, the repeating unit derived from the conjugated diene-based monomer may mean a repeating unit formed by the conjugated diene-based monomer during polymerization, and the repeating unit derived from the aromatic vinyl monomer means a repeating unit formed by the aromatic vinyl monomer during polymerization.

Meanwhile, the solution-polymerized conjugated diene-based rubber according to an embodiment of the present invention may be prepared by polymerizing an aromatic vinyl-based monomer and a conjugated diene-based monomer in a hydrocarbon solvent including a modification initiator to prepare an active polymer combined with an organometal, and then reacting the active polymer thus prepared with a modifier.

The hydrocarbon solvent is not specifically limited, but may be, for example, one or more selected from the group consisting of n-pentane, n-hexane, n-heptane, isooctane, cyclohexane, toluene, benzene and xylene.

The conjugated diene-based monomer is not specifically limited, but may be, for example, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, or 2,4-hexadiene, and may particularly be 1,3-butadiene.

The aromatic vinyl monomer is not specifically limited, but may be, for example, styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, or the like, and may particularly be styrene.

The modification initiator may be a compound prepared by reacting the organometal compound and an amine group-containing compound.

The organometal compound may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butyl phenyl lithium, 4-tolyllithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide and lithium isopropylamide.

The amine group-containing compound may be, for example, a compound represented by Formula 1 below.

[Formula 1]

In Formula 1, $R_1$ to $R_3$ are each independently hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, $R_4$ is a single bond; a substituted or unsubstituted alkylene group of 1 to 20 carbon atoms with a substituent; a substituted or unsubstituted cycloalkylene group of 5 to 20 carbon atoms with a substituent; or a substituted or unsubstituted arylene group of 6 to 20 carbon atoms with a substituent, wherein the substituent is an alkyl group of 1 to 10 carbon atoms, a cycloalkyl group of 5 to 10 carbon atoms, or an aryl group of 6 to 20 carbon atoms, $R_5$ is an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; a heterocyclic group of 3 to 30 carbon atoms; or a functional group represented by Formula 1a or Formula 1b below, and n is an integer of 1 to 5, and at least one of $R_5$ groups is a functional group represented by Formula 1a or Formula 1b below, in case where n is an integer of 2 to 5, a plurality of $R_5$ groups may be the same or different,

[Formula 1a]

in Formula 1a, $R_6$ is a substituted or unsubstituted alkylene group of 1 to 20 carbon atoms with a substituent; a substituted or unsubstituted cycloalkylene group of 5 to 20 carbon atoms with a substituent; or a substituted or unsubstituted arylene group of 6 to 20 carbon atoms with a substituent, wherein the substituent is an alkyl group of 1 to 10 carbon atoms, a cycloalkyl group of 5 to 10 carbon atoms, or an aryl group of 6 to 20 carbon atoms, $R_7$ and $R_8$ are each independently a substituted or unsubstituted alkylene group of 1 to 20 carbon atoms with an alkyl group of 1 to 10 carbon atoms, a cycloalkyl group of 5 to 10 carbon atoms, or an aryl group of 6 to 20 carbon atoms, $R_9$ is hydrogen; an alkyl group of 1 to 30 carbon atoms, an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and X is an N, O or S atom, in case where X is O or S, $R_9$ is not present,

[Formula 1b]

in Formula 1b, $R_{10}$ is a substituted or unsubstituted alkylene group of 1 to 20 carbon atoms with a substituent; a substituted or unsubstituted cycloalkylene group of 5 to 20 carbon atoms with a substituent; or a substituted or unsubstituted arylene group of 6 to 20 carbon atoms with a substituent, wherein the substituent is an alkyl group of 1 to 10 carbon atoms, a cycloalkyl group of 5 to 10 carbon atoms, or an aryl group of 6 to 20 carbon atoms, and $R_{11}$ and $R_{12}$ are each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms.

In addition, the modifier may be, for example, a compound represented by Formula 2 below.

[Formula 2]

In Formula 2, $A_1$ and $A_2$ are each independently an alkylene group of 1 to 20 carbon atoms, $R_{23}$ to $R_{28}$ are each independently an alkyl group of 1 to 20 carbon atoms, and $L_1$ and $L_2$, and $L_3$ and $L_4$ are connected with each other to form rings of 1 to 5 carbon atoms, respectively, where the rings formed by connecting $L_1$ and $L_2$, and $L_3$ and $L_4$ with each other include one to three heteroatoms selected from the group consisting of N, O and S.

Second Synthetic Rubber

In an embodiment of the present invention, the second synthetic rubber may be a butadiene-based rubber, particularly, a butadiene-based rubber in which the cis bond content in a polymer may be 96 wt % or more.

In addition, the polybutadiene-based rubber may have the vinyl bond content of 50 wt % or less. Particularly, the cis bond content may be 96 wt % or more and the vinyl content may be 40 wt % or less in the polymer. Here, the cis bond and the vinyl bond are measured by Fourier Transform Infrared Spectroscopy.

Meanwhile, the butadiene-based rubber may be prepared by polymerizing a conjugated diene-based monomer using a rare earth metal catalyst, a transition metal catalyst or an alkali metal catalyst, and the conjugated diene-based monomer is the same as described above.

In addition, in an embodiment of the present invention, the butadiene-based rubber may use a commercial butadiene-based rubber having the above-described physical properties, for example, Nd—BR, Ni—BR, Co—BR or Li—BR.

Filler

In an embodiment of the present invention, the filler may be mixed with the rubber components and play the role of improving the physical properties of the rubber composition, and may particularly be silica.

For example, the silica may be wet silica (hydrated silicate), dry silica (anhydrous silicate), calcium silicate, aluminum silicate, or colloid silica. Preferably, the silica may be the wet silica which has the most significant improving effect of destruction characteristics and compatible effect of wet grip.

Meanwhile, the rubber composition according to an embodiment of the present invention may further include other rubber components, as necessary, in addition to the rubber components described above, and in this case, the other rubber components may be included in an amount of 90 wt % or less based on the total weight of the rubber composition.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, and a halogenated butyl rubber, and any one or a mixture two or more thereof may be used.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight based on 100 parts by weight of a rubber component. With the amount used in the above range, elasticity and strength required for a vulcanized rubber composition may be secured, and at the same time, an excellent low fuel consumption ratio may be achieved.

In addition, if silica is used as the filler, a silane coupling agent may be used together in the rubber composition according to an embodiment of the present invention for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl)polysulfide or 3-trimethoxysilylpropylbenzothiazyltetrasulfide may be used in consideration of the improving effect of reinforcing properties.

The rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition, and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of a vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion resistance may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or a tire including a tire tread.

Hereinafter, the present invention will be explained in more detail referring to embodiments. However, the embodiments are for illustrating the present invention, and the scope of the present invention is not limited thereto.

In the Examples and Comparative Examples, parts by weight of other components excluding the rubber components are shown based on 100 parts by weight of the rubber components used in each of the Examples and Comparative Examples.

In addition, the same materials were used as the other components excluding the rubber components in the Examples and Comparative Examples. The coupling agent was bis(3-triethoxysilylpropyl)tetrasulfide (TESPT), the process oil was TDAE oil, and the vulcanization accelerator was N-cyclohexyl-2-benzothiazylsulfenamide (CZ) or diphenylguanidine (DPG).

Example 1

63 parts by weight of a solution-polymerized both terminal-modified styrene-butadiene rubber (styrene content of 39 wt %, vinyl content of 25 wt %, extender oil content of 5 wt %) (MF3925, LG Chem), 40 parts by weight of a rare earth-catalyzed butadiene rubber (cis bond content of 96 wt %), 70 parts by weight of silica, 5.6 parts by weight of a coupling agent, 27.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta$) between the solution-polymerized both terminal-modified styrene-butadiene rubber and the rare earth-catalyzed butadiene rubber was 0.89 (solubility parameter of solution-polymerized both terminal-modified styrene-butadiene rubber=18.06, solubility parameter of rare earth-catalyzed butadiene rubber=17.17).

Example 2

63 parts by weight of a solution-polymerized both terminal-modified styrene-butadiene rubber (styrene content of 43 wt %, vinyl content of 25 wt %, extender oil content of 5 wt %) (MF4325, LG Chem), 40 parts by weight of a rare earth-catalyzed butadiene rubber (cis bond content of 96 wt %), 70 parts by weight of silica, 5.6 parts by weight of a coupling agent, 27.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta$) between the solution-polymerized both terminal-modified styrene-butadiene rubber and the rare earth-catalyzed butadiene rubber was 1.00 (solubility parameter of solution-polymerized both terminal-modified styrene-butadiene rubber=18.17, solubility parameter of rare earth-catalyzed butadiene rubber=17.17).

Example 3

84 parts by weight of a solution-polymerized both terminal-modified styrene-butadiene rubber (styrene content of 39 wt %, vinyl content of 25 wt %, extender oil content of 5 wt %) (MF3925, LG Chem), 20 parts by weight of a rare earth-catalyzed butadiene rubber (cis bond content of 96 wt %), 100 parts by weight of silica, 8.0 parts by weight of a coupling agent, 36.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta$) between the solution-polymerized both terminal-modified styrene-butadiene rubber and the rare earth-catalyzed butadiene rubber was 0.89 (solubility parameter of solution-polymerized both terminal-modified styrene-butadiene rubber=18.06, solubility parameter of rare earth-catalyzed butadiene rubber=17.17).

Comparative Example 1

63 parts by weight of a solution-polymerized single terminal-modified styrene-butadiene rubber (styrene content of 21 wt %, vinyl content of 50 wt %, extender oil content of 5 wt %) (F2150, LG Chem), 40 parts by weight of a rare earth-catalyzed butadiene rubber (cis bond content of 96 wt %), 70 parts by weight of silica, 5.6 parts by weight of a coupling agent, 27.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta$) between the solution-polymerized single terminal styrene-butadiene rubber and the rare earth-catalyzed butadiene rubber was 0.23 (solubility parameter of solution-polymerized single terminal-modified styrene-butadiene rubber=17.40, solubility parameter of rare earth-catalyzed butadiene rubber=17.17).

Comparative Example 2

82.5 parts by weight of a solution-polymerized single terminal-modified styrene-butadiene rubber (styrene content of 39 wt %, vinyl content of 25 wt %, extender oil content of 37.5 wt %) (F3925, LG Chem), 40 parts by weight of a rare earth-catalyzed butadiene rubber (cis bond content of 96 wt %), parts by weight of silica, 5.6 parts by weight of a coupling agent, 7.5 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta$) between the solution-polymerized single terminal styrene-butadiene rubber and the rare earth-catalyzed butadiene rubber was 0.89 (solubility parameter of solution-polymerized single terminal-modified styrene-butadiene rubber=18.06, solubility parameter of rare earth-catalyzed butadiene rubber=17.17).

Comparative Example 3

75 parts by weight of a solution-polymerized single terminal-modified styrene-butadiene rubber (styrene content of 36 wt %, vinyl content of 26 wt %, extender oil content of 25 wt %) (F3626Y, LG Chem), 40 parts by weight of a rare earth-catalyzed butadiene rubber (cis bond content of 96 wt %), 70 parts by weight of silica, 5.6 parts by weight of a coupling agent, 15.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta$) between the solution-polymerized styrene-butadiene rubber and the rare earth-catalyzed butadiene rubber was 0.80 (solubility parameter of solution-polymerized single terminal-modified styrene-butadiene rubber=17.97, solubility parameter of rare earth-catalyzed butadiene rubber=17.17).

Comparative Example 4

84 parts by weight of a solution-polymerized single terminal-modified styrene-butadiene rubber (styrene content of 21 wt %, vinyl content of 50 wt %, extender oil content of 5 wt %) (F2150, LG Chem), 20 parts by weight of a rare earth-catalyzed butadiene rubber (cis bond content of 96 wt %), 100 parts by weight of silica, 8.0 parts by weight of a coupling agent, 36.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta$) between the solution-polymerized single terminal styrene-butadiene rubber and the rare earth-catalyzed butadiene rubber was 0.23 (solubility parameter of solution-polymerized single terminal-modified styrene-butadiene rubber=17.40, solubility parameter of rare earth-catalyzed butadiene rubber=17.17).

Comparative Example 5

105 parts by weight of a solution-polymerized single terminal-modified styrene-butadiene rubber (styrene content of 21 wt %, vinyl content of 50 wt %, extender oil content of 5 wt %) (F2150, LG Chem), 100 parts by weight of silica, 8.0 parts by weight of a coupling agent, 35.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition.

Comparative Example 6

105 parts by weight of a solution-polymerized both terminal-modified styrene-butadiene rubber (styrene content of 39 wt %, vinyl content of 25 wt %, extender oil content of 5 wt %) (MF3925, LG Chem), 100 parts by weight of silica, 8.0 parts by weight of a coupling agent, 35.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition.

Experimental Examples

In order to compare and analyze the physical properties of the rubber compositions prepared in the Examples and Comparative Examples, and molded products therefrom, tensile properties, abrasion resistance and viscoelasticity properties were measured, and the results are shown in Table 1 and Table 2 below. In addition, rubber components, other components, and the amounts thereof used for preparing the rubber compositions of the Examples and Comparative Examples are shown together in Table 1 and Table 2.

1) Tensile Properties

The tensile properties were measured by manufacturing each specimen and measuring tensile strength when broken and tensile stress when elongated by 300% (300% modulus) of each specimen according to an ASTM 412 tensile test method. Particularly, tensile properties were measured using a Universal Test Machin 4204 tensile tester (Instron Co.) in a rate of 50 cm/min at room temperature.

2) Abrasion Resistance

The abrasion resistance of the rubber specimen manufactured by the same method described in the tensile properties was measured using a DIN abrasion tester, where a worn loss weight was measured after applying a load of 10 N to a rotation drum to which an abrasion paper was attached, and moving the rubber specimen to a perpendicular direction of the rotational direction of the drum. The abrasion resistance was index based on the loss weight of Comparative Example 2. The rotation speed of the drum was 40 rpm, and a total moving distance of the specimen after finishing the test was 40 m. The greater the index value of the loss weight is, the better the abrasion resistance is.

3) Viscoelasticity Properties

The viscoelasticity properties were measured by measuring G" (dynamic loss modulus, E") and tan δ by changing deformation at each measurement temperature (−100° C.-80° C.) with a frequency of 10 Hz in a twist mode by using a dynamic mechanical analyzer (TA Co., ARES G2). If the index value of tan δ at a low temperature of 0° C. increases, wet skid resistance (braking performance) becomes better, and if the index value of tan δ at a high temperature of 60° C. increases, hysteresis loss decreases, and low running resistance (fuel consumption ratio) becomes better.

In addition, by performing a temperature sweep test through the dynamic mechanical analyzer, G" change was measured, and through this, phase separation phenomenon due to compatibility difference among rubbers was secured.

4) Transmission Electron Microscopy (TEM) Analysis

Each rubber composition was manufactured into a thin slice by microtoming and a TEM image was measured with the magnification of 20K-200K by using a Titan G2 80-200 Field emission transmission electron microscope equipment (TEI Co.).

TABLE 1

| Division | | Comparative Example 1 | Comparative Example 2 | Comparative Example 3 | Example 1 | Example 2 |
|---|---|---|---|---|---|---|
| First synthetic rubber | F2150 | 63 | — | — | — | — |
| | F3925 | — | 82.5 | — | — | — |
| | F3626Y | — | — | 75 | — | — |
| | MF3925 | — | — | — | 63 | — |
| | MF4325 | — | — | — | — | 63 |
| Second synthetic rubber | CB24 | 40 | 40 | 40 | 40 | 40 |
| Solubility parameter difference | | 0.23 | 0.89 | 0.80 | 0.89 | 1.00 |
| Silica | | 70 | 70 | 70 | 70 | 70 |
| Coupling agent | | 5.6 | 5.6 | 5.6 | 5.6 | 5.6 |
| Process oil | | 27.0 | 7.5 | 15.0 | 27.0 | 27.0 |
| Zinc oxide | | 3 | 3 | 3 | 3 | 3 |
| Stearic acid | | 1 | 1 | 1 | 1 | 1 |
| Sulfur powder | | 1.5 | 1.5 | 1.5 | 1.5 | 1.5 |
| Vulcanization accelerator | | 2.8 | 2.8 | 2.8 | 2.8 | 2.8 |
| Tensile properties | 300% modulus | 100 | 105 | 102 | 104 | 105 |
| | Elongation (%) | 100 | 109 | 103 | 113 | 110 |

TABLE 1-continued

| Division | | Comparative Example 1 | Comparative Example 2 | Comparative Example 3 | Example 1 | Example 2 |
|---|---|---|---|---|---|---|
| Abrasion resistance | | 100 | 101 | 103 | 110 | 109 |
| viscoelasticity | Tan δ @ 0° C. | 100 | 104 | 95 | 122 | 125 |
| | Tan δ @ 60° C. | 100 | 82 | 85 | 108 | 107 |

In Table 1 above, the resultant values of the tensile properties, abrasion resistance and viscoelasticity for Example 1, Example 2, Comparative Example 2 and Comparative Example 3 were indexed based on the measurement values of Comparative Example 1 and shown.

As shown in Table 1 above, it was found that the tensile properties and viscoelasticity properties were significantly better and the abrasion resistance was improved for Example 1 and Example 2 according to embodiments of the present invention when compared with Comparative Example 1 to Comparative Example 3.

Particularly, Example 1 and Example 2 showed excellent tensile properties and viscoelasticity properties and largely improved abrasion resistance, but Comparative Example 1 and Comparative Example 3, which included homogenuous synthetic rubbers having a solubility parameter difference between two synthetic rubbers of 0.82 or less, showed markedly decreased tensile properties and viscoelasticity properties and largely decreased abrasion resistance.

Figure 1:
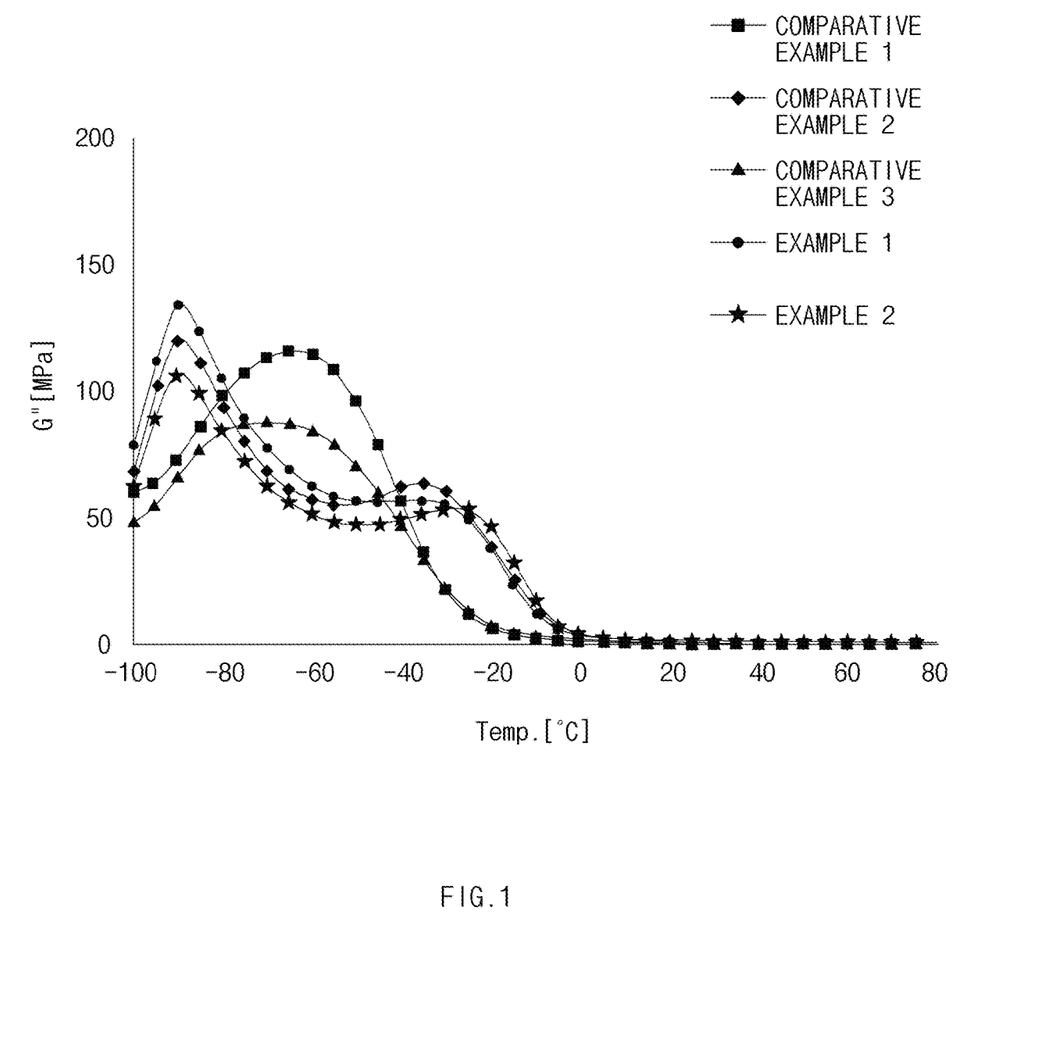
FIG. 1 shows a G" (dynamic loss modulus) change graph in accordance with the temperature on rubber compositions of Example 1 and Example 2 and Comparative Example 1 to Comparative Example 3 according to embodiments of the present invention.
Figure 2A:
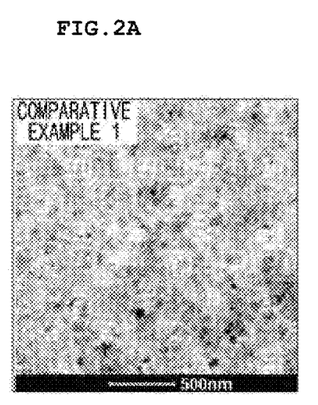
FIG. 2A is a TEM image corresponding to Comparative Example 1.
Figure 2B:
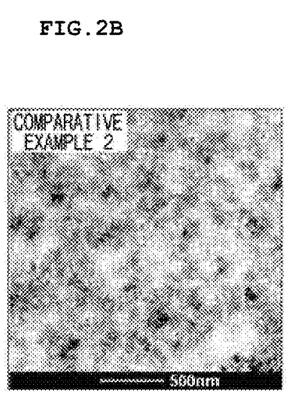
FIG. 2B is a TEM image corresponding to Comparative Example 2.
Figure 2C:
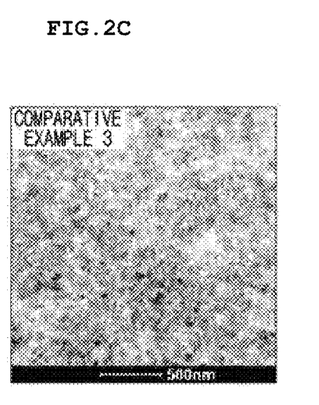
FIG. 2C is a TEM image corresponding to Comparative Example 3.
Figure 2D:
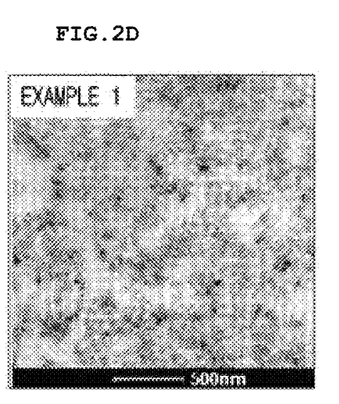
FIG. 2D is a TEM image corresponding to Example 1.
Figure 2E:
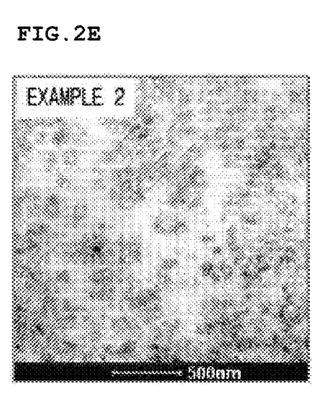
FIG. 2E is a TEM image corresponding to Example 2.

In addition, as shown in FIG. 1, it may be found that Example 1 and Example 2 have two inflection points but Comparative Example 1 and Comparative Example 3 have one inflection point. Here, the inflection point is generally considered as the glass transition temperature, and thus, two inflection points represent the presence of two glass transition temperatures. That is, in case of Example 1 and Example 2, two glass transition temperatures may be shown due to the phase separation of two synthetic rubbers by controlling compatibility so that each of the rubber components in the rubber composition are not mixed to a completely homogeneous state by controlling solubility parameter difference between the two synthetic rubbers to a specific range. In case of Comparative Example 1 and Comparative Example 3, solubility parameter difference between two synthetic rubbers is small, and the rubber components in the rubber composition are mixed into a completely homogeneous state, and thus, one phase is obtained and one glass transition temperature is shown. This phenomenon may be confirmed through the TEM images of FIGS. 2A to 2E, particularly, it may be found that distinct phase separation is shown in Example 1 and Example 2.

Through the results, in case of Example 1 and Example 2, effects shown by each synthetic rubber is maintained due to the phase separation of two synthetic rubbers by controlling compatibility so that the rubber components in the rubber composition are not mixed to a completely homogeneous state by controlling solubility parameter difference between the two synthetic rubbers to a specific range or more, but in case of Comparative Example 1 and Comparative Example 3, solubility parameter difference between two synthetic rubbers is small, and the rubber components in the rubber composition are mixed into a completely homogeneous state, and thus, effects shown by each synthetic rubber is not maintained.

In addition, in case of Comparative Example 2, two synthetic rubbers were included but the solubility parameter difference was controlled in the range suggested in the present invention, and thus, it was found that tensile properties showed similar degree but abrasion resistance and viscoelasticity properties were markedly decreased when compared with Example 1.

TABLE 2

| Division | | Comparative Example 4 | Comparative Example 5 | Comparative Example 6 | Example 3 |
|---|---|---|---|---|---|
| First synthetic rubber | F2150 | 84 | 105 | — | — |
| | F3925 | — | — | 105 | 84 |
| Second synthetic rubber | CB24 | 20 | — | — | 20 |
| Solubility parameter difference | | 0.23 | — | — | 0.89 |
| Silica | | 100 | 100 | 100 | 100 |
| Coupling agent | | 8.0 | 8.0 | 8.0 | 8.0 |
| Process oil | | 36.0 | 35.0 | 35.0 | 36.0 |
| Zinc oxide | | 3 | 3 | 3 | 3 |
| Stearic acid | | 1 | 1 | 1 | 1 |
| Sulfur powder | | 1.5 | 1.5 | 1.5 | 1.5 |
| Vulcanization accelerator | | 2.8 | 2.8 | 2.8 | 2.8 |
| Tensile properties | 300% modulus | 100 | 117 | 124 | 105 |
| | Elongation (%) | 100 | 81 | 86 | 105 |
| Abrasion resistance | | 100 | 77 | 87 | 103 |
| viscoelasticity | Tan δ @ 0° C. | 100 | 143 | 197 | 142 |
| | Tan δ @ 60° C. | 100 | 101 | 126 | 111 |

In Table 2 above, the resultant values on the tensile properties, abrasion resistance and viscoelasticity of Example 3, and Comparative Examples 5 and 6 were indexed based on the measured values of Comparative Example 4 and shown.

As shown in Table 2 above, it was found that Example 3 according to an embodiment of the present invention showed improved abrasion resistance, better tensile properties and markedly higher viscoelasticity properties when compared with Comparative Example 4.

Figure 3:
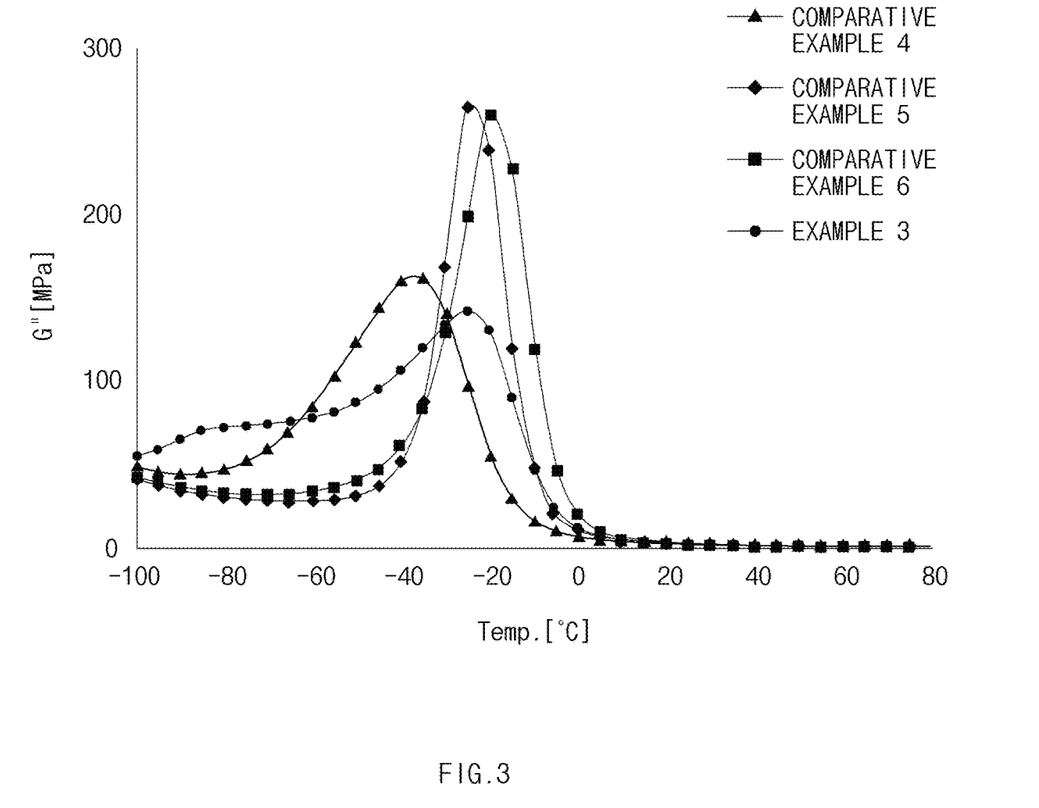
FIG. 3 shows a G" (dynamic loss modulus) change graph in accordance with the temperature on rubber compositions of Example 3 and Example 4 and Comparative Example 4 to Comparative Example 6 according to embodiments of the present invention.
Figure 4A:
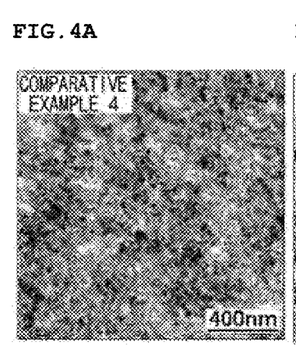
FIG. 4A is a TEM image corresponding to Comparative Example 4.
Figure 4B:
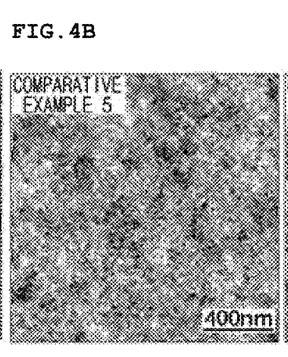
FIG. 4B is a TEM image corresponding to Comparative Example 5.
Figure 4C:
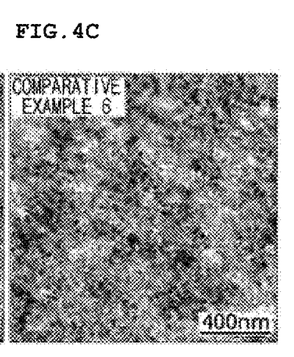
FIG. 4C is a TEM image corresponding to Comparative Example 6.
Figure 4D:
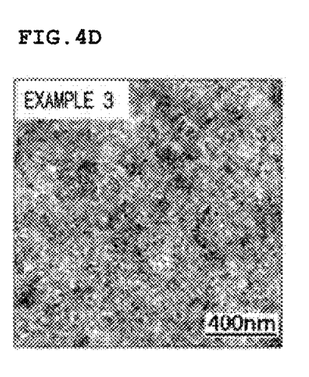
FIG. 4D is a TEM image corresponding to Example 3.

In addition, as shown in FIG. 3, Example 3 had two inflection points which represent glass transition temperatures, but Comparative Example 4 had one inflection point. In this case, in Example 3 and Comparative Example 4, the ratios of the first synthetic rubber and silica were increased and the ratio of the second synthetic rubber was decreased when compared with Comparative Example 1. Through FIG. 3, it may be found that even though the ratios in the rubber composition were changed, Example 3 according to an embodiment of the present invention showed two glass transition temperatures due to the phase separation between two synthetic rubbers by controlling compatibility by controlling solubility parameter difference between two synthetic rubbers to a specific range or more, and Comparative Example 4 showed one glass transition temperature by having one phase due to a small solubility parameter difference between two synthetic rubbers. In addition, in Comparative Example 5 and Comparative Example 6, only one rubber component was included and only one phase was shown, and this was confirmed by one inflection point in FIG. 3. These results could be confirmed from TEM images of FIGS. 4A to 4D, particularly, Example 3 was found to show distinct phase separation phenomenon. Also, in Comparative Example 5 and Comparative Example 6, it may be found that viscoelasticity properties were excellent, but the glass transition temperature of the rubber composition was increased due to the absence of the second synthetic rubber which had relatively low glass transition temperature, and abrasion resistance was markedly reduced.

The invention claimed is:

1. A rubber composition, comprising,
   30 parts by weight to 90 parts by weight of a first synthetic rubber, based on 100 parts by weight of the first and second synthetic rubbers;
   10 parts by weight to 70 parts by weight of a second synthetic rubber, based on 100 parts by weight of the first and second synthetic rubbers; and
   30 to 200 parts by weight of a filler, based on 100 parts by weight of the first and second synthetic rubbers,
   wherein a solubility parameter difference between the first synthetic rubber and the second synthetic rubber is greater than 0.82,
   the first synthetic rubber is a modified rubber having functional groups bonded to both end-terminals, and
   the first synthetic rubber hash a styrene content of 38 wt % or more.

2. The rubber composition according to claim 1, wherein the solubility parameter difference between the first synthetic rubber and the second synthetic rubber is greater than 0.82 and less than or equal to 1.05.

3. The rubber composition according to claim 1, wherein the first synthetic rubber is a solution-polymerized conjugated diene-based rubber.

4. The rubber composition according to claim 3, wherein the solution-polymerized conjugated diene-based rubber comprises an extender oil in an amount of greater than 0 wt % and less than or equal to 37.5 wt %.

5. The rubber composition according to claim 1, wherein the second synthetic rubber is a butadiene-based rubber having a cis bond content of 96 wt % or more.

6. The rubber composition according to claim 1, wherein the filler is silica.

7. The rubber composition according to claim 1, wherein the rubber composition further comprises a vulcanizing agent.

8. A tire manufactured using the rubber composition described in claim 1.

9. The rubber composition according to claim 7, wherein the vulcanizing agent is a sulfur powder.

10. The rubber composition according to claim 7, wherein the vulcanizing agent is present in an amount of 0.1 parts by weight to 10 parts by weight based on 100 parts by weight of the first and second synthetic rubbers.

* * * * *